May 17, 1966 R. D. WOODSON 3,251,614
ARTICULATED PIPE JOINT
Filed Aug. 7, 1963

INVENTOR.
Riley D. Woodson
BY
*Hovey, Schmidt, Johnson & Hovey*
ATTORNEYS.

United States Patent Office 3,251,614
Patented May 17, 1966

3,251,614
ARTICULATED PIPE JOINT
Riley D. Woodson, 2012 W. 50th Terrace,
Shawnee, Kans.
Filed Aug. 7, 1963, Ser. No. 300,447
1 Claim. (Cl. 285—114)

This invention relates to an assembly for joining lengths of pipe together whereby to form a continuous run of pipe, the assembly joining the pipe in such a manner that relative shifting movement or articulation of the lengths of pipe which make up the complete run is allowed.

It is the most important object of this invention to provide an articulated pipe joint assembly for joining a first length of pipe with a second length of pipe, the assembly including a web suitably secured interiorly of each the adjacent ends of the corresponding lengths of pipe, the webs being joined together by a link whereby to maintain the lengths of pipe in alignment, but yet to allow relative shifting movement thereof as a result of the flow of fluid within the pipe or the dimensional changes of the pipe resulting from various factors.

Another important aim of this invention is to provide an articulated pipe joint assembly wherein the webs disposed in each of the adjacent ends of two lengths of pipe are positioned transversely to the longitudinal axes of the lengths of pipe, the interconnecting link being disposed longitudinally of said lengths of pipe at substantially the center line thereof whereby to interconnect said webs, the interconnecting link having a spacer member whereby to maintain said webs, and, therefore, the end edges of said lengths of pipe in spaced-apart relationship.

It is yet a further object of this invention, in both forms thereof, to provide an assembly for joining lengths of pipe together which applies restraint against hydraulic and mechanical forces acting upon the lengths of pipe and which cause relative shifting movement of the lengths of pipe, the joint assembly allowing a limited degree of shifting movement and also serving to transfer said forces to the pipe wall whereby to prevent undue stress upon the pipe walls or the forcing thereof into an "out of shape" condition.

A yet further important aim of this invention is to provide a pipe joint assembly which is relatively simple in construction and low in cost whereby a number of the assemblies may be used in joining the lengths of a run of pipe together, the use of multiple assemblies, as a result of the fact that they allow relative shifting movement between lengths of pipe and compensate for misalignment of the lengths of pipe, permitting easier installation of the pipe run and preventing damage to expensive pipe and conduit assemblies.

Other objects of this invention include details of construction of the two forms thereof illustrated in the drawing, as well as other features thereof which will become apparent from the following specification and accompanying drawing, wherein.

Figure 1:
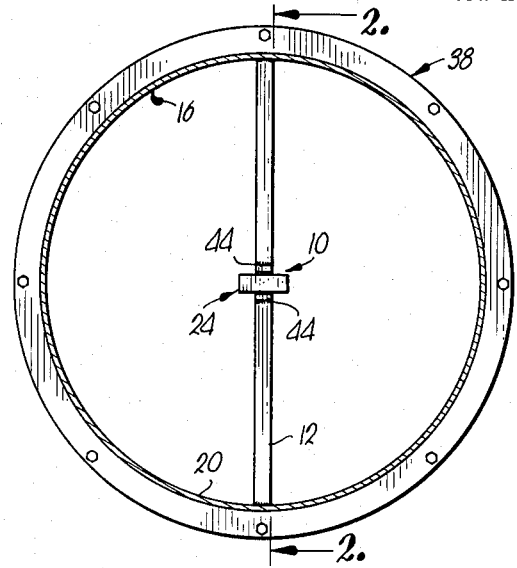
FIGURE 1 is an end elevational view showing one form of the assembly positioned within lengths of pipe.

It is well known that, when joining lengths of large pipe or conduit together to form a continuous pipe run, such as those used to transmit fluids to large generating plants or the like and which are commonly of a diameter on the order of 54 inches, the lengths of pipe comprising the run are subject to dimensional changes and a certain degree of structural distortion due to the temperature and pressure changes, not only interiorly of the pipe but exteriorly thereof. Thus, such lengths of pipe cannot be rigidly joined together but, inasmuch as the ends of the run thereof are normally rigidly fixed, compensating structure must be built into the run of pipe whereby to accommodate the relative shifting movement of the lengths of pipe due to the factors above mentioned. To this end, there is provided the articulated pipe joint of the present invention, two forms thereof being illustrated in the drawing, although it will be appreciated that various other forms thereof might be developed without departing from the scope of this invention.

Figure 2:
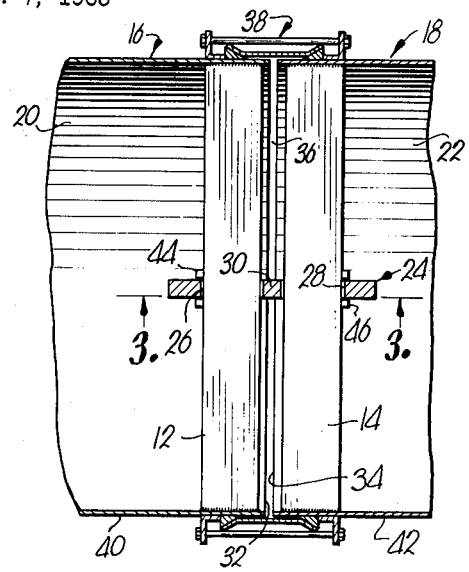
FIG. 2 is a sectional view taken along line 2—2 of FIG. 1.
Figure 3:
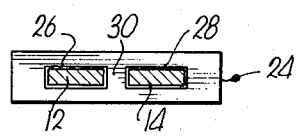
FIG. 3 is a sectional view along line 3—3 of FIG. 2.

In the form of the invention illustrated in FIGS. 1–3 the pipe joint assembly, broadly designated by the numeral 10, consists primarily of a pair of webs 12 and 14, said webs each being secured interiorly of a corresponding length of pipe 16 and 18 respectively, as by welding the ends of the webs to the inner surfaces 20 and 22 of the lengths 16 and 18 respectively.

The webs are interconnected by a link designated as 24, which link has a pair of spaced-apart openings 26 and 28 formed therein, which openings each receive a corresponding web 12 and 14.

The link 24 has a portion 30 disposed between said openings 26 and 28 and, therefore, between the webs 12 and 14 whereby to maintain the webs in spaced-apart relationship and therefore maintain the end edges 32 and 34 of lengths of pipe 16 and 18 in similar spaced-apart relationship.

To seal the space 36 thus presented, there is provided a fluid-sealing member 38 which is in the nature of a conventional Dresser coupling, which coupling surrounds the exterior surfaces 40 and 42 of lengths of pipe 16 and 18, respectively, and spans space 36 whereby to prevent the flow of fluid out of the joint through space 36.

In the form of the invention shown in FIGS. 1–3, the webs 12 and 14 take the form of elongated bars having their ends welded to the inner surfaces 20 and 22 of lengths 16 and 18, respectively, the bars being positioned transversely of the longitudinal axes of said lengths 16 and 18 and positioned just inside the adjacent ends of said lengths 16 and 18.

Webs 12 and 14 are each provided with a pair of lugs 44 and 46 respectively, which serve to retain the link 24 in perpendicular relationship to webs 12 and 14 and at the center line of the lengths of pipe 16 and 18. It will be noted that link 24 is disposed longitudinally of the lengths of pipe 16 and 18 and at substantially the center line axes thereof.

The webs 12 and 14 may be fabricated from a steel bar or the like, it being desirable that the same be of a minimal cross-sectional configuration whereby to present the smallest possible resistance to the flow of fluid through the lengths 16 and 18. Likewise, the link 24 may be fabricated from a length of steel bar by forming the openings 26 and 28 therein and the entire pipe joint assembly pre-assembled prior to inserting the same within the lengths of pipe 16 and 18. When the assembly is inserted in the adjacent ends of the lengths of pipe, the outer ends of the webs 12 and 14 are welded thereto and the coupling 38 placed about the adjacent ends, thus completing the positioning of the assembly 10.

When fabricating the assembly 10 it is desirable to have a sloppy fit of the webs 12 and 14 within their corresponding openings 26 and 28 of the link 24 whereby to allow the relative shifting movement between the lengths 16 and 18 as the various forces are imposed thereupon which result in such shifting movement, such movement also being permitted through a sloppy fit between link 24 and lugs 44. Thus, it will be appreciated that if the forces exerted on the lengths 16 and 18 are such as to cause an attempted extension thereof, such as would result from a surge of water, hydraulic pressures or the like, the extension will be limited by the area of movement allowed the webs 12 and 14 within the openings 26 and 28 of the link 24 but, inasmuch as said openings are larger than the webs received thereby, it will be appreciated that some degree of longitudinal and angular shifting movement of the lengths with respect to one another will be permitted. Likewise, if compression forces are brought to bear upon the joint assembly, the movement of the ends of the lengths 16 and 18 toward one another will be limited by the spacer member 30, although it will be appreciated that a certain degree of compressive and angular movement will be allowed. In this regard, if it is desired to allow the full compressive movement of the pipe ends toward one another, the spacer bar 30 could be eliminated.

Likewise, due to the sloppy fit of the webs 12 and 14 within their openings, angular or lateral movement of the lengths 16 and 18 with respect to one another will be permitted to a certain degree, this degree depending upon the area of the openings 26 and 28 and the size of spacer 30, as well as the extent of spacings such as 36 between the end edges 32 and 34 of the lengths 16 and 18. It will be appreciated that, due to the degree of relative movement permitted by assembly 10 between lengths 16 and 18, the assembly 10 is effective in compensating for rather major misalignments between the ends of lengths such as 16 and 18 of a pipe run, thereby allowing such lengths to be joined together to complete the run even though the ends of the various lengths are not in exact alignment.

It will be further noted that as various forces are brought to bear upon the joint assembly 10, the same will be transmitted from the link 24 through the webs 12 and 14, to the wall of the lengths of pipe 16 and 18 thus serving to distribute the strains in such a manner that the effects thereof upon the configuration or position of the lengths 16 and 18 will be minimized.

When such relative shifting movement or articulation of the lengths of pipes 16 and 18 is taking place such as hereinabove described, the coupling 38 is of sufficient flexibility to accommodate the same and to continue to seal the space 36 between the ends 32 and 34 of the lengths 16 and 18, thereby preventing flow of fluid therefrom.

Figure 4:
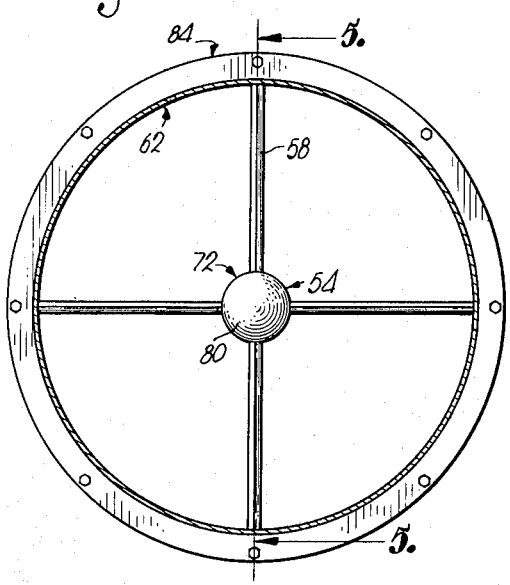
FIG. 4 is an end elevational view showing a modified form of the assembly positioned within lengths of pipe.
Figure 5:
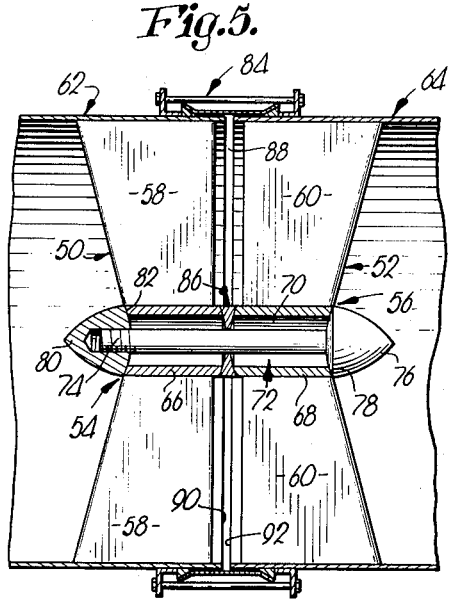
FIG. 5 is a sectional view taken along line 5—5 of FIG. 4.

The modified form of the invention illustrated in FIGS. 4 and 5 of the drawing incorporates the same basic components of a pair of webs and an interconnecting link, the webs 50 and 52 each including a hub 54 and 56, respectively, having a plurality of radially extending spokes 58 and 60, the outer ends of the spokes being secured to the inner surface of the ends of adjacent lengths of pipe 62 and 64.

The hubs 54 and 56 are tubular in configuration whereby to present sleeve portions 66 and 68, said sleeve portions cooperating to define a central passage 70. The webs 50 and 52 are interconnected through hubs 54 and 56 by means of a link 72, in the nature of a bolt, link 72 having a shank 74 received within passage 70 defined by sleeve portions 66 and 68. The head 76 of the link 72 is loosely seated upon a seat 78 defined by one end of sleeve portion 68 of hub 56 and a nut 80 which is received by the threaded end of the shank 74, seats loosely upon a similar seat 82 provided by sleeve portion 66 of hub 54. It will be noted that the head 76 and nut 80 of link 72 are streamlined in configuration whereby to present a minimum resistance to the flow of fluid through pipes 62 and 64.

A conventional Dresser fluid seal coupling 84 is positioned exteriorly of the lengths of pipe 62 and 64 for the purpose of preventing the leakage of fluid therefrom.

The spokes 58 and 60 of the webs 50 and 52 are in the nature of flat sheets of metal, the spokes having sharpened leading edges whereby to aid in reducing the resistance to the flow of fluid within the lengths of pipes 62 and 64.

The sleeve portions 66 and 68 of hubs 54 and 56 receive relatively loosely therebetween an annular spacer member 86 which is substantially triangular in cross-sectional configuration, the apex edge of the spacer member 86 being proximal to the shank 74 of link 72. The spacer member 86 is formed from a rigid material whereby to limit the shifting movement of the sleeve portions 66 and 68 toward one another as the lengths 62 and 64 are urged in such a direction. The relatively loose or sloppy fit of member 86 between the inner adjacent ends of sleeves 66 and 68 and the loose or sloppy seating of head 76 on seat 78 and nut 80 on seat 82, allows both compressive and expansive movement between the lengths 62 and 64 as well as permitting relative lateral or angular articulating movement therebetween. The provision of spacer member 86 creates a space 88 between the end edges 90 and 92 of lengths of pipe 62 and 64 respectively, the said space being sealed by coupling member 84, the seal being preserved by member 84 during relative shifting movement of lengths 62 and 64.

It will be appreciated that the assembly shown in FIGS. 4 and 5 of the drawing functions in the same general manner as that shown in FIGS. 1–3 of the drawing, whereby relative shifting movement between the lengths of pipe 62 and 64 is permitted as above described, the assembly shown in FIGS. 4 and 5 having the additional feature of being adjustable through the utilization of link 72 which may be drawn to the desired degree of fit when the assembly is positioned within the lengths 62 and 64 whereby to allow either a greater or lesser amount of relative movement as may be desired and as may be dictated by the conditions to which the lengths may be subjected during the normal use thereof.

The spokes 58 and 60 of the assembly of FIGS. 4 and 5 are positioned transversely of the lengths of pipe 62 and 64 respectively, and the interconnecting link 72 is positioned longitudinally thereof, said link 72 being substantially centrally disposed with respect to the lengths of pipe 62 and 64. Thus, as forces are brought to bear upon the assemblies, the same are transmitted to the walls of the pipe whereby to allow relative shifting movement or articulation between adjacent lengths of pipe, but to minimize the adverse effects of such movement upon the structure of such lengths of pipe.

It will be appreciated that assemblies of the nature hereinabove described are useful in compensating for misalignment between the lengths of pipe constituting a run of pipe inasmuch as they allow relative movement between the adjacent ends of lengths of pipe, thereby allowing such ends to be communicatively joined together notwithstanding their misalignment. Also, the use of a plurality of such assemblies in a pipe run which is, throughout its over-all length, disposed in several planes, permits a relatively large degree of articulating and relative shifting movement of the lengths constituting the run and therefore, the run, without damage to the run or the joints therebetween, such movement being fully compensated for by the joint assemblies.

Having thus described the invention, what is claimed as new and desired to be secured by Letters Patent is:

An assembly for joining an end of a first length of pipe to an end of a second length of pipe when said lengths are in substantially aligned relationship, said assembly comprising at least one bar extending transversely of the longitudinal axis of each length of pipe and secured thereto at the adjacent ends thereof to be joined, said bars being in aligned, spaced-apart relationship when the ends of the respective lengths of pipe are aligned; at least one link joining said bars, said link extending longitudinally of said lengths of pipe, said link having a pair of spaced-apart openings therein, each of said openings loosely receiving one of said bars to allow for shifting movement of the bars with respect to the link, a portion of said link extending between said bars whereby to maintain the same and the ends of said lengths of pipe in spaced-apart relationship; and lug means on each of said bars for retaining said link in a position substantially parallel to and closely adjacent to or substantially in the plane of the longitudinal axis of said lengths of pipe whereby to permit relative shifting movement of the lengths of pipe.

References Cited by the Examiner

UNITED STATES PATENTS

| 994,471 | 6/1911 | Koenig | 285—262 |
|---|---|---|---|
| 1,007,362 | 10/1911 | Koenig | 285—262 |

FOREIGN PATENTS

| 26,134 | 1896 | Great Britain. |
|---|---|---|
| 807,336 | 1/1959 | Great Britain. |

CARL W. TOMLIN, *Primary Examiner.*